United States Patent
Telgkamp et al.

(10) Patent No.: US 9,316,562 B2
(45) Date of Patent: Apr. 19, 2016

(54) SYSTEM AND METHOD FOR MONITORING THE STATE OF STRUCTURAL COMPONENTS

(75) Inventors: Jens Telgkamp, Buxtehude (DE); Holger Speckmann, Schwanewede (DE); Bengt Abel, Hamburg (DE)

(73) Assignee: Airbus Operations GmbH (DE)

( * ) Notice: Subject to any disclaimer, the term of this patent is extended or adjusted under 35 U.S.C. 154(b) by 1204 days.

(21) Appl. No.: 12/988,446

(22) PCT Filed: Apr. 18, 2008

(86) PCT No.: PCT/EP2008/054737
§ 371 (c)(1),
(2), (4) Date: Nov. 29, 2010

(87) PCT Pub. No.: WO2009/127260
PCT Pub. Date: Oct. 22, 2009

(65) Prior Publication Data
US 2011/0071770 A1    Mar. 24, 2011

(51) Int. Cl.
*G01B 5/28* (2006.01)
*G01M 5/00* (2006.01)

(52) U.S. Cl.
CPC .................................. *G01M 5/0033* (2013.01)

(58) Field of Classification Search
CPC .................................................... G01M 5/0033
USPC ......................................................... 702/35
See application file for complete search history.

(56) References Cited

U.S. PATENT DOCUMENTS 4,104,906 A    8/1978   Oertle
4,448,080 A    5/1984   Dressel et al.
5,770,794 A    6/1998   Davey
6,748,791 B1 * 6/2004   Georgeson et al. .......... 73/12.13
7,810,378 B2 * 10/2010  Hunaidi et al. ............ 73/40.5 A
2008/0264177 A1 10/2008 Bockenheimer et al.
2009/0211072 A1 * 8/2009 Volta .................... F16L 13/0236
                                                                  29/402.13

FOREIGN PATENT DOCUMENTS

DE       3049628 A1      7/1982
DE      69419608 T2      3/2000
DE       10257259 A1     7/2004
DE    102004057290 A1    9/2005

(Continued)

OTHER PUBLICATIONS

German Office Action Application No. 10 2007 014 160.4-54, dated Oct. 24, 2007.

*Primary Examiner* — Tung S Lau
*Assistant Examiner* — Xiuquin Sun
(74) *Attorney, Agent, or Firm* — Lerner, David, Littenberg, Krumholz & Mentlik, LLP (57) ABSTRACT

The invention relates to a structural component, to a system and to a method for monitoring the integrity of a structure or a structural component. The structural component according to the invention has at least one elongated air duct which can be connected to a vacuum source and to a device for detecting the volumetric flow of air and/or the air pressure in the air duct, wherein, when the structure is intact in the region of the air duct, the air pressure in the air duct essentially corresponds to the air pressure of the vacuum source and there is essentially no volumetric flow of air through the air duct but, when a structural defect occurs in the region of the air duct, air from the region surrounding the structure or structural component enters the air duct and increases the air pressure and volumetric flow of air in the air duct in an identifiable manner.

13 Claims, 7 Drawing Sheets

(56) References Cited

FOREIGN PATENT DOCUMENTS

| | | |
|---|---|---|
| DE | 102005012816 A1 | 12/2005 |
| DE | 102004054615 A1 | 6/2006 |
| WO | 2007104110 A1 | 9/2007 |
| WO | WO 2007104110 A1 * | 9/2007 |

* cited by examiner

SYSTEM AND METHOD FOR MONITORING THE STATE OF STRUCTURAL COMPONENTS

CROSS-REFERENCE TO RELATED APPLICATIONS

The present application is a national phase entry under 35 U.S.C. §371 of International Application No. PCT/EP2008/054737 filed Apr. 18, 2008, published in German, the disclosure of which is hereby incorporated herein by reference.

The invention relates to a system for monitoring the integrity of a structure or of a structural component with at least one elongated air duct that is connectable to a vacuum source and a device for acquiring the air pressure and/or an air volume flow in the air duct. The invention furthermore relates to a structural component and a method for monitoring the integrity of a structure or of a structural component.

Such systems and methods for monitoring the state of structural components (also referred to as "structural health monitoring", SHM) are known. By means of permanently applied or integrated structural state sensors continuous and automatic monitoring of structural components can take place. Thereby any stresses, strains, and damages in the form of cracks, fractures, detachments, delaminations or corrosion damage are detected in order to ensure structural integrity. An SHM system essentially comprises a sensor and apparatus or a device for acquiring, storing and processing sensor data, including associated connection elements. In this arrangement the requirements of an SHM system relate to high reliability in finding damage; resistance to temperature fluctuations, environmental influences and mechanical loads; suitability for integration in an existing production process; ease of maintenance; and the ability for self-diagnosis. Furthermore, reparability is of importance.

A particularly easily retrofittable option for monitoring structural components, e.g. for aircraft structures, is, for example a comparative vacuum monitoring (CVM) sensor that can be applied to a surface of a structural component to be monitored. Such a sensor, as for example described in DE 10 2004 057 290 A1, comprises an elastic rubber-like or silicon-like material and comprises a flat, plate-shaped design. A surface of the sensor comprises groove-shaped indentations (also referred to as "galleries"), which are arranged at a relatively short distance from each other and parallel to each other and that extend into the sensor plane. The surface of the sensor, which surface comprises these indentations, is applied onto the area of the structural component, which area is to be monitored, so that the indentations are covered, thus forming parallel ducts.

The ducts are alternately either connected to the surroundings of the structure or to a vacuum source so that each channel that is subjected to negative pressure is arranged adjacent to an indentation that is subjected to ambient air pressure and vice versa. The pressure differential between the indentations that are subsumed by a distributor and that are connected to the vacuum source, and the indentations that are also subsumed by a distributor but that comprise indentations subjected to ambient air pressure is either measured continuously (online) during exposure to load (e.g. in flight), or if required is measured in the non-loaded state (offline) on the ground. If there is a crack in the structural component located underneath the sensor, and if the crack is sufficiently wide, all the ducts arranged on the crack are connected to each other. Air from the respective adjacent ducts that are connected to the surroundings enters the ducts subjected to a vacuum. With continuous monitoring of the volume flow between the galleries, a vacuum breakdown in one or several ducts can be registered and can be interpreted as structural damage by apparatus that processes corresponding sensor data.

Due to their design and application on structural surfaces to be monitored, CVM sensors are susceptible to mechanical and chemical influences. If such CVM sensors are, for example, used for monitoring an aircraft structure, during the regular maintenance work it may happen that one or several sensors that have been applied to the surface are damaged when an aircraft mechanic moves along in the structure. Moreover, it cannot be ruled out that, in particular in applications in a passenger aircraft, damaging chemical substances act on the sensors so that the permanent reliability of damage detection can no longer be guaranteed. Furthermore, the complete monitoring of large structures is always associated with additional weight, because sensors have to be bonded to the structural components to be monitored. Depending on the structure to be monitored, proper placement of the sensors can be expensive and, using the example of an aircraft, exactly identical positioning on the structural surface of several aircraft of the same design by predominantly manual application is practically impossible. Furthermore, the durability of the sensor material and of the adhesive in terms of ageing, in view of the necessary service life, for example, of an aircraft structure (>30 years) is critical, especially under difficult conditions with repeated contact with oil, kerosene and hydraulic fluid. Furthermore, during subsequent affixation of sensors to a finished product or at a very late point in time of manufacture (e.g. during final assembly of an aircraft) low acceptance can be anticipated since at the stage of final assembly the processes are time critical to a high extent, and optimised processes are logistically very complex at that stage.

It is thus the object of the invention to reduce one or several of the above-mentioned disadvantages or to eliminate them altogether. It is, in particular, the object of the invention to propose a system, a method and a sensor by means of which any damage to structural components can be reliably detected. In this arrangement the sensor is to be protected against chemical and mechanical influence, and is to have a service life at least as long as the service life of the structure to be monitored. Furthermore, the precise arrangement of the sensor relative to the structure to be monitored is to be ensured in a simple manner.

The invention meets this object in that the air duct is integrated as a hollow space in the structure to be monitored or in the structural component to be monitored. One or several air duct/s directly embedded in the structure, which together with the component comprising the duct form the sensor, is/are associated with several advantages when compared to the state of the art. Such an air duct is clearly better protected against external influences than is the case in a conventional CVM sensor. Breaking off or severing the sensor is not possible, because the sensor is formed by the absence of material within a component that forms the structure. The air duct can only be mechanically damaged if the corresponding structural component is destroyed.

When compared to the state of the art, the weight of the sensor is clearly more advantageous because the weight of the structure is reduced as a result of the air ducts and is correspondingly even lighter than in a non-monitored conventional structure. If applicable, the profile cross section can be modified in such a manner that the material "saved" by the hollow space is added at some other position of the cross section in order to compensate for reduced bearing strength as a result of the hollow space. Even in that case there are weight savings when compared to the conventional solution, because it is no longer necessary to put external sensors in place. This is particularly advantageous if the system according to the invention is to be used in aircraft.

Since, furthermore, the sensor is integrated in the semifinished product early in the production process, among other things the sensors can be positioned exactly identically in all the structural components. The expected service life of the sensor in the form of an air duct corresponds at least to the service life of the structure to be monitored, because it is an identical component.

Furthermore, with the incorporation of several air ducts it is possible to achieve redundancy. This means that if one duct is blocked, one or several other ducts are available for monitoring the structure.

Advantageous improvements of the system, method and structural component according to the invention are stated in the subordinate claims.

Below, the invention is explained in more detail with reference to the figures. Identical objects in the figures have the same reference characters. The following are shown.

In relatively large structures, for example in aircraft, monitoring of the individual structural components by means of the system according to the invention presents itself. The structural components are reliably equipped with devices that render their integrity measurable for the entire service life of the aircraft. To the operator of the structure, the advantages associated with such monitoring relate to reduced expenditure for conventional inspections, as well as possibly more advantageous dimensioning of the structure, because in a monitored structure fewer conservative assumptions relating to the state of the structure need to be made. For this reason the following exemplary embodiment is shown with reference to an exemplary structural stiffening element ("stringer") of an aircraft. The system according to the invention is, however, not limited to exclusive use in aircraft. Instead it can be used in any larger or smaller structures that are subjected to static or dynamic loads. In the example of an aircraft, the identical monitoring of frame profiles would be particularly recommendable.

Figure 1:
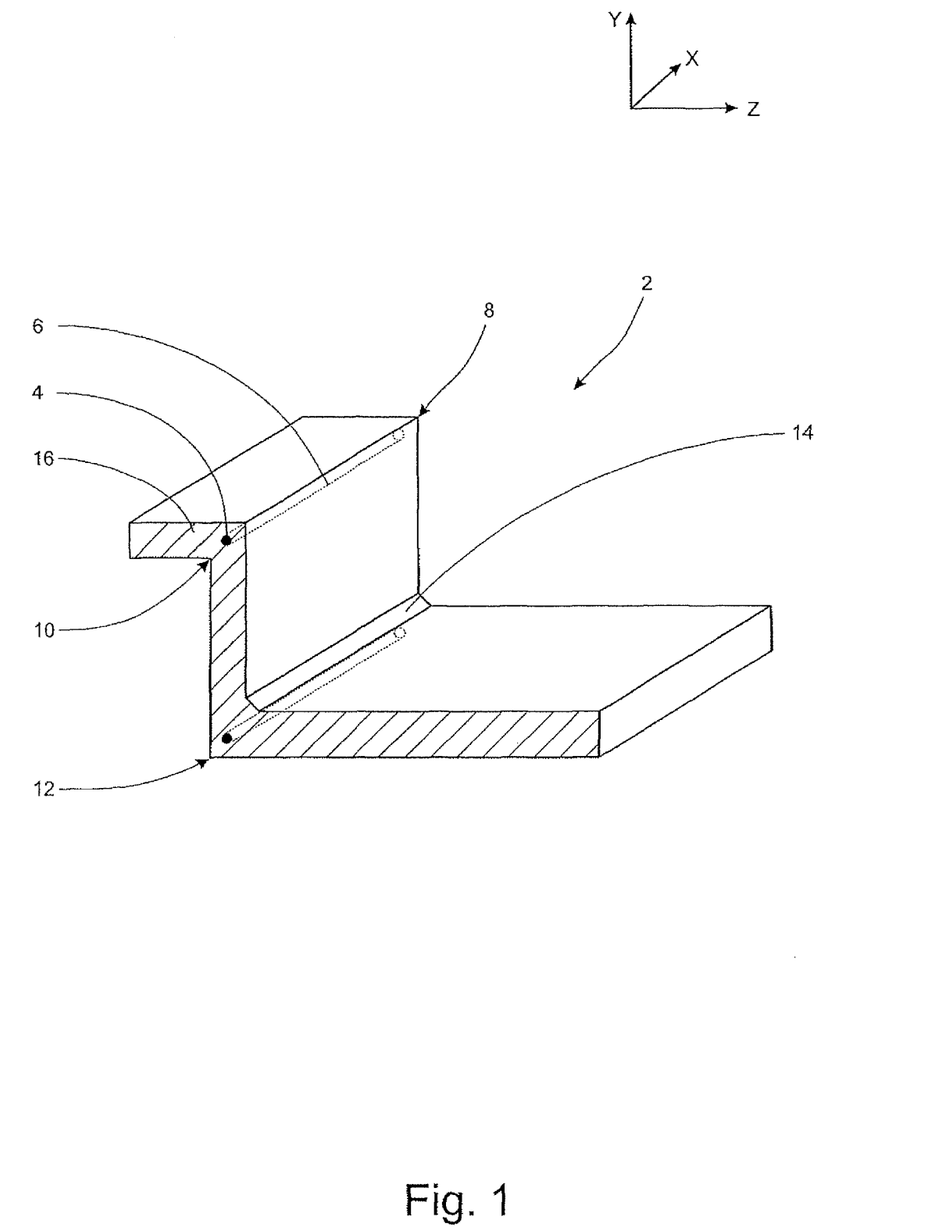
FIG. 1: a diagrammatic section view of a structural component.

For the purpose of clarifying the invention FIG. 1 in an exemplary manner shows a much simplified structural component 2, a similar form of which is used for the longitudinal stiffening of aircraft fuselages. The structural component 2, which hereinafter is also referred to as a "stringer", comprises two sensor cavities 4 according to the invention, which are located in regions where the material thickness is adequate. The sensor cavities 4 (shown by dashed lines 6) extend over the entire length of the stringer 2, which length extends in the x-direction of the shown coordinate system. In this arrangement one of the two sensor cavities 4 is arranged between two upper edges 8 and 10 of the stringer 2. The further sensor cavity 4 is located between a lower edge 12 and a lower edge face 14 of the stringer 2. Both sensor cavities 4 are connected to a vacuum source and an air volume sensor and/or a pressure transducer, in a manner similar to that of the above-mentioned CVM sensors. In this arrangement the sensors and the vacuum source can be designed as a single compact device.

If damage in the form of a crack or fracture occurs at any position of the cross section 16 of the stringer 2, and if said crack or fracture extends through (or damages) one of the two sensor cavities 4, the sensor cavity 4 concerned is pneumatically connected to the surroundings of the stringer 2 so that the air pressure in the sensor cavity 4 becomes similar to that of the surroundings of the stringer. The air contained in the sensor cavity 4 is drawn to the vacuum source, wherein at the same time air flows through the opening, caused as a result of the damage, in the cross section 16 into the sensor cavity 4 to equalize the pressure gradient. This results in a constant air flow in the sensor cavity 4. By monitoring the air flow or air pressure within the sensor cavities 4 it is thus possible to detect damage. Furthermore, approximate location of the damage that has occurred is possible if several monitored sensor cavities 6 are used. If in the cross section 16 shown, for example, at first a crack occurs at the upper end, which crack grows through the upper sensor cavity 4, the vacuum breakdown is first detected in this sensor cavity 4. This would indicate that damage to the upper edge of the stringer 2 has occurred. If the crack grows in a downwards direction through the stringer 2, it reaches the lower sensor cavity 4 where the applied vacuum then also breaks down. Locating the occurrence of damage becomes more accurate with an increase in the number, and sensible distribution, of the sensor cavities 4 in the cross section 16, so that a crack can be detected significantly before the stringer 2 fails completely, i.e. said crack can be detected as soon as it meets the first sensor cavity 4.

Producing a structural component that is similar to the stringer 2 could take place by means of an extrusion or extrusion molding method. In this process a block of the desired material, heated to forming temperature, is pressed through a matrix by means of a stamp. In this process cavities can be generated by means of variously formed mandrels, for example the sensor cavities 4 shown in FIG. 1. If applicable, a bridging tool can be used for extrusion. When using the system according to the invention for monitoring structures or structural components of an aircraft, in particular aluminium, titanium or other lightweight but solid materials are used. As an alternative to the above, any other commonly used materials are possible, for example plastics or steels.

Figure 2:
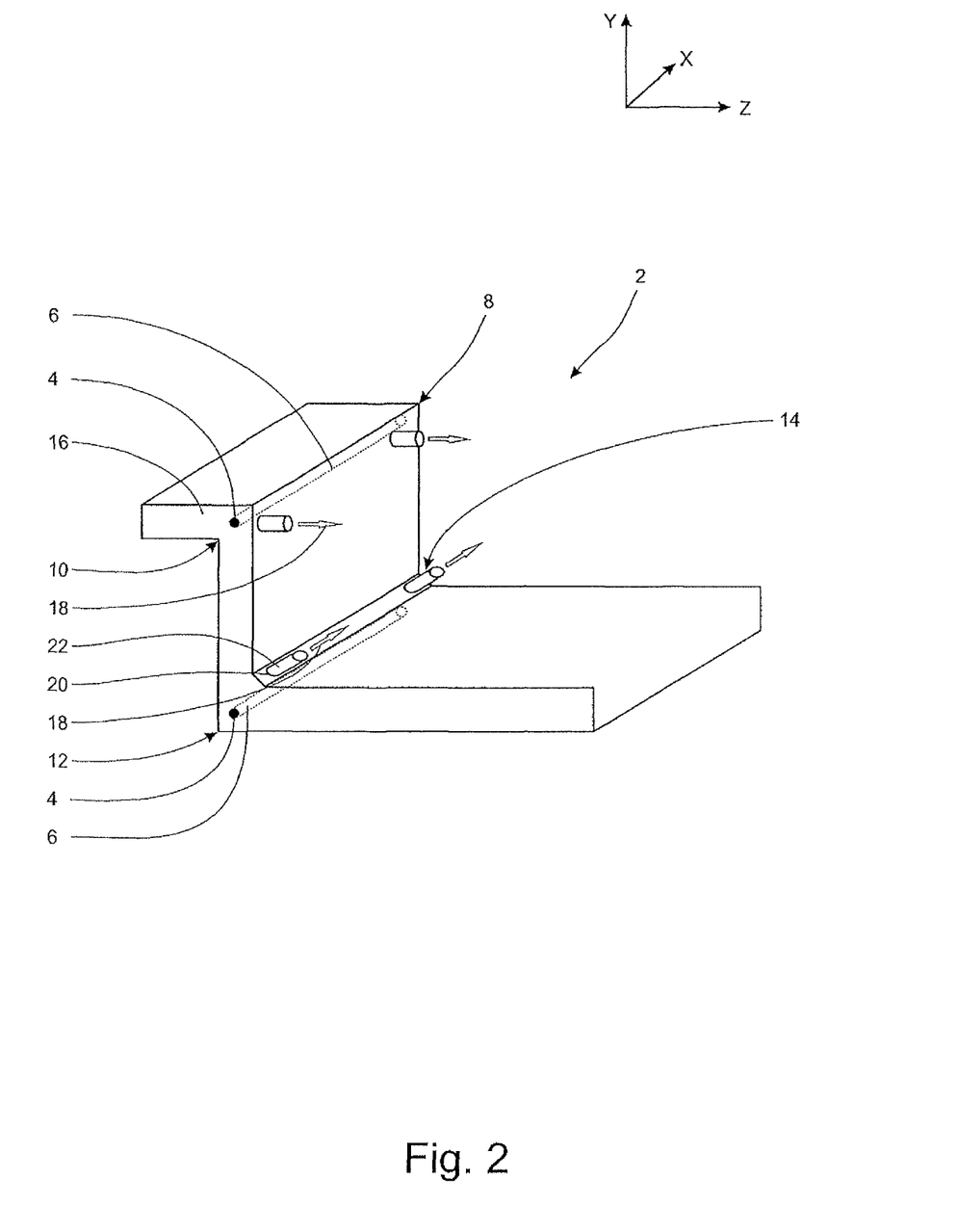
FIG. 2: a diagrammatic view of a structural component with connected lines.

For the purpose of monitoring a sensor cavity 4 an external line 18 is connected to the hole 6, as shown in an exemplary manner in FIG. 2 by the lower sensor cavity 4 of the exemplary stringer 2. A connecting piece 22 is inserted in a through hole 20 that points towards the sensor cavity 4. The diameter of the through hole 20 is larger than that of the sensor cavity 6 so that tolerances in the shape of the cross section 16 of the stringer 2 can be compensated for and the through hole 20 is reliably connected to the sensor cavity 6. In order to seal the connecting piece 22 in the hole 20 the connecting piece 22 is soldered, welded, bonded and/or pressed into place. Finally, the line 18, which can be a hose, pipe or the like, is connected to the connecting piece 22. The sensor cavities 4, which after manufacture are open on each side of the stringer 2, are preferably closed off directly after extrusion by means of a solder point or a weld point. As an alternative to the solder points or weld points it can also be favourable if a non-closed standard profile is used, wherein a sealing plug is placed near the profile end as is furthermore also described below with reference to a repair method. This provides an advantage in that the fine sensor cavities 4 are not damaged during subsequent treatment or during installation of the stringer 2. Thereafter the stringer 2 can be processed in the conventional manner without incurring damage.

As an alternative to the aforesaid, the sensor cavities 4 can be fitted on both sides with bushes and plugs (not shown in detail) so that sensor cavities 4 that are arranged in structural components to be connected to each other can be combined during assembly of the structural components. On the other hand it is also advantageous to provide bushes, arranged on both ends and accessible from the outside, for connection to lines comprising corresponding plugs.

Figure 3:
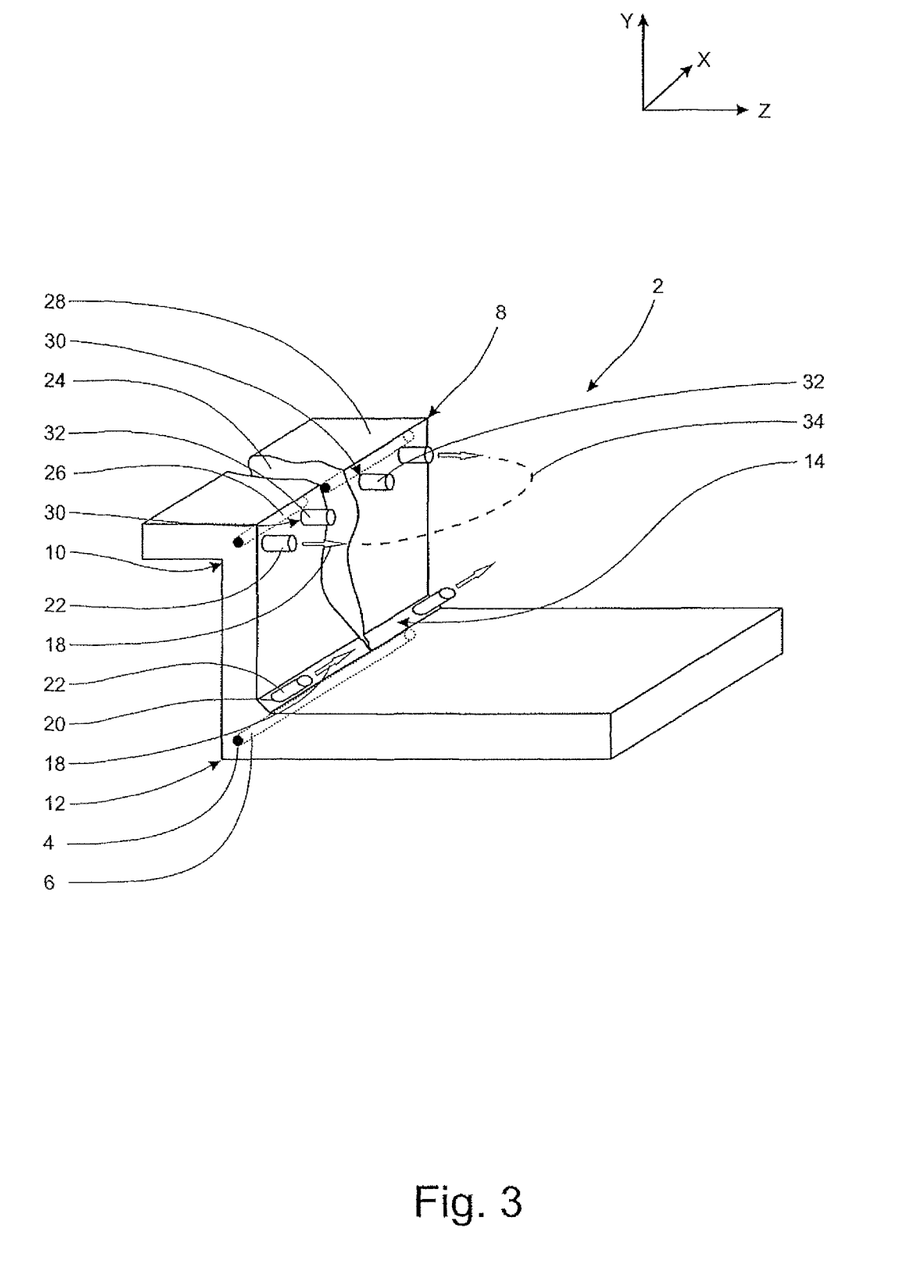
FIG. 3: a diagrammatic view of a cracked structural component.

If it is necessary to repair a structural component and to subsequently restore the sensor function of a sensor cavity 4, a method shown in FIG. 3 can be used for this. This is appropriate in particular in cases where the damaged structural component does not need to be replaced, i.e. where repair work is adequate for restoration, or for safe continued operation. In the stringer 2, which is again selected as an example, there is, for example, a crack 24 as shown in FIG. 3. The crack 24 has split the original upper sensor cavity 4, as a result of which this sensor cavity 4 has pneumatically connected itself to the surroundings of the stringer 2. It would no longer be possible to maintain a vacuum in this sensor cavity 6. In order to restore the sensor functions, the sensor cavities 4 that are situated in the two remaining sections 26 and 28 need to be reconnected to each other. To this effect it is proposed, for example, on both sides of the crack 24 in each case to drill a through hole 30 underneath the edge 8. Sealing plugs 32 are placed into these holes 30 whose diameter is larger than that of the original sensor cavities 6, which sealing plugs seal the remaining hole sections 26 and 28 towards the crack 24. In a manner similar to that already shown in FIG. 2, connecting pieces 22 are then placed underneath the edge 8 and onto the edge face 14, which connecting pieces are located on the side of the sealing plugs 32 which faces away from the crack 24. By means of bridging lines 34 the connecting plugs 22 that are opposite each other in the x-direction are connected to each other or to other surface sensors for monitoring the repair component. The crack 24 can be repaired by conventional means, for example by means of a riveted doubler. The function of the sensors 4 of the damaged stringer 2 is restored.

In order to improve the ability to locate a defect in a structure to be monitored, and in order to take into account access to the monitored structural components by means of connecting pieces 22, segmentation of individual structural components and/or structural regions can be sensible. Damage detection with the system according to the invention can only differentiate between an intact sensor cavity 4 and a damaged sensor cavity 4. Segmentation is to be designed in such a manner that from the point of view of measuring effort the lowest possible number of sensor cavities 4 are monitored, while in order to provide at least the ability to approximately locate faults in the structure, a certain density of monitored sensor cavities 4 is maintained.

Figure 4:
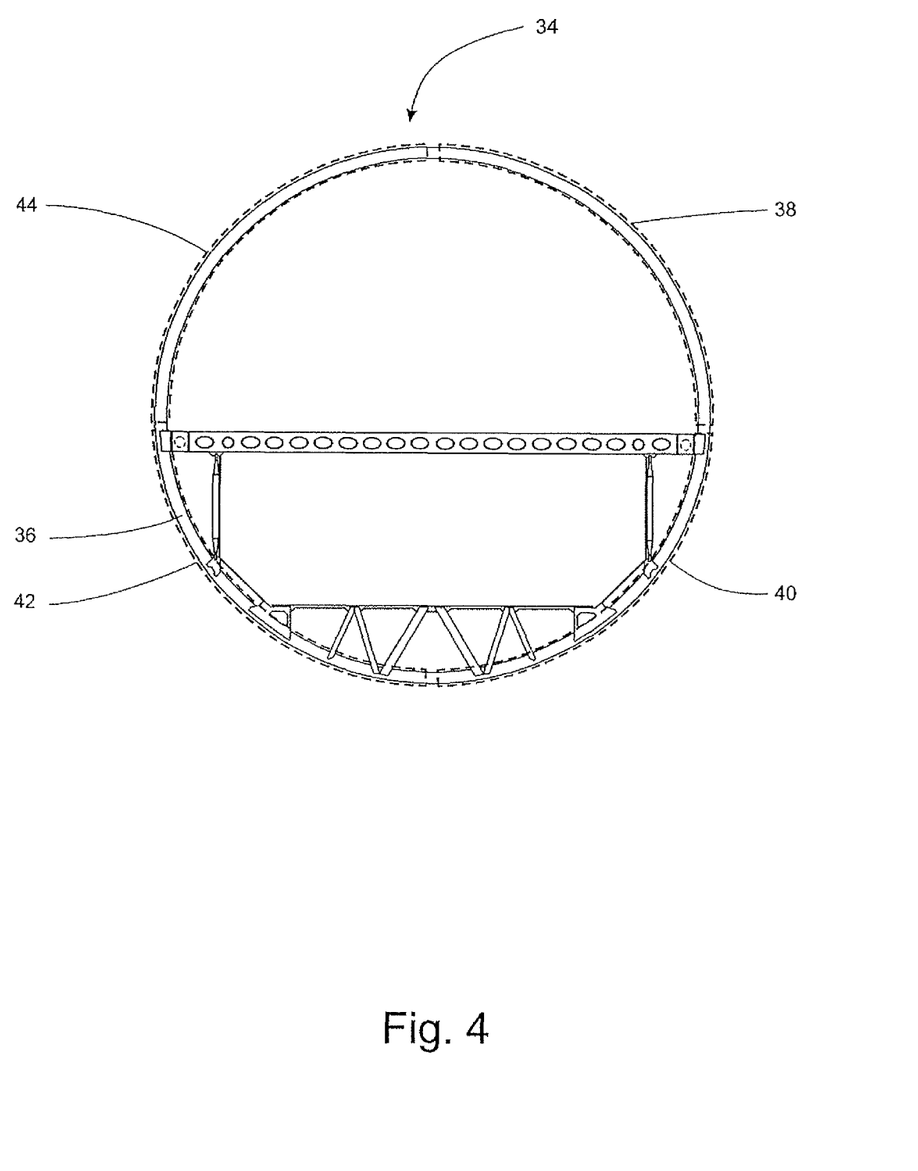
FIG. 4: a diagrammatic section view of an aircraft fuselage with segmented frame profiles.

With reference to the example of an aircraft fuselage as shown in cross section in FIG. 4, segmentation is explained in more detail. The aircraft fuselage comprises several frame profiles 36, for example each comprising four segments 38, 40, 42 and 44. Each of these segments 38-44 comprises one or several sensor cavities 4. In order to provide the best-possible accuracy when locating damage that has occurred, each one of the segments 38-44 is monitored individually. A failure of an individual segment is thus detectable, and a defect on the frame profile 36 can be located, even if only approximately. For example, if faults occur on segment 38 or segment 44, by removal of the corresponding cabin lining the frame profile 36 can be made accessible and can be repaired relatively easily. In order to reduce expenditure it is, however, also possible to monitor the plurality of segments 38-44 of a frame profile 36 as a whole, and to pneumatically interconnect the respective sensor cavities 4 in a manner similar to that shown in FIG. 3. In front of and/or behind individual segments 38-44, optional valves (not shown in the figures) can block the respective air flow so that, if the system according to the invention reports a structural fault, the region comprising the defect can be localised by blocking the valves and by subsequent renewed checking.

If the system according to the invention is used in a passenger aircraft, it is appropriate to divide a frame profile 36 into two segments. By means of the first sensor segment, which combines the segments 38 and 44 shown in FIG. 4, the frame profile 36 can be monitored above a cabin floor, and by means of the second segment, which is a combination of the segments 40 and 42, the frame profile 36 below the cabin floor can be monitored. When compared to combining all the segments 38-44, this results in reduced maintenance expenditure because it is only necessary to remove lateral panelling in the passenger cabin, or panelling or frame profile insulation in the cargo compartment, in order to locate and repair the fault in the frame profile 36. At the same time, against the background of the number of frame elements in a larger passenger aircraft the measuring effort is kept to a relatively low level.

Figure 5:
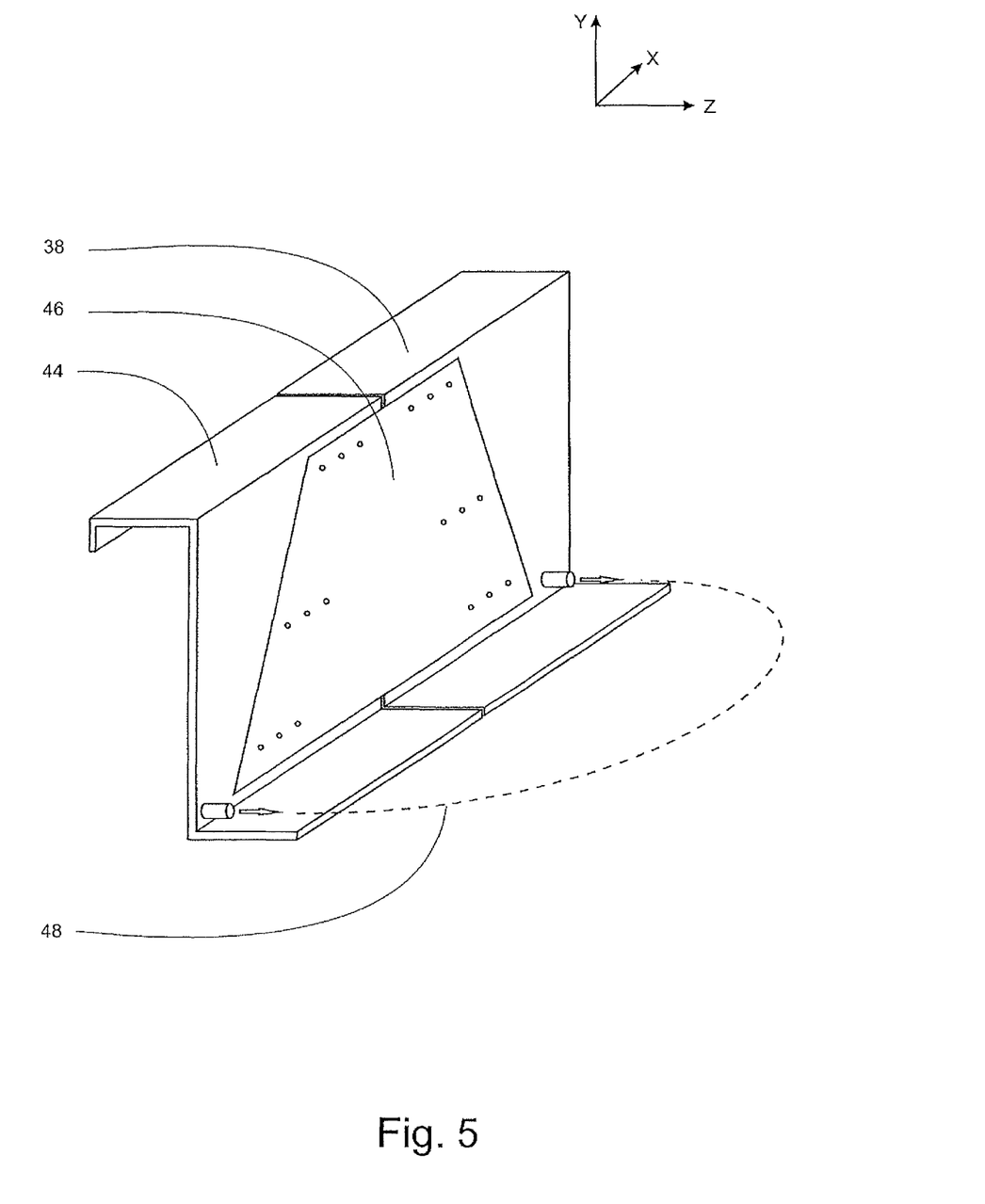
FIG. 5: a diagrammatic view of connected structural components with connected sensor cavities.

As an example, FIG. 5 shows the joint between two segments 38 and 44 of a frame profile 36, which segments 38 and 44 are connected to a screwed or riveted plate-shaped connecting element 46. The holes 6 of the segments 38 and 44 each comprise a connecting piece 22 near the abutting joint. The two adjacent or opposite connecting pieces 22 are connected, by means of a bridging line 48, to each other or to a surface sensor for monitoring the connecting element 46. The ends of the sensor cavities 4, which ends face the abutting joint, have been closed by means of a solder point or weld point or the like so that any aspiration of air from the surroundings of the frame profile 36 is prevented. It would also be possible to use sealing plugs near the ends of the sensor cavities 4 instead of solder points or weld points.

Figure 6:
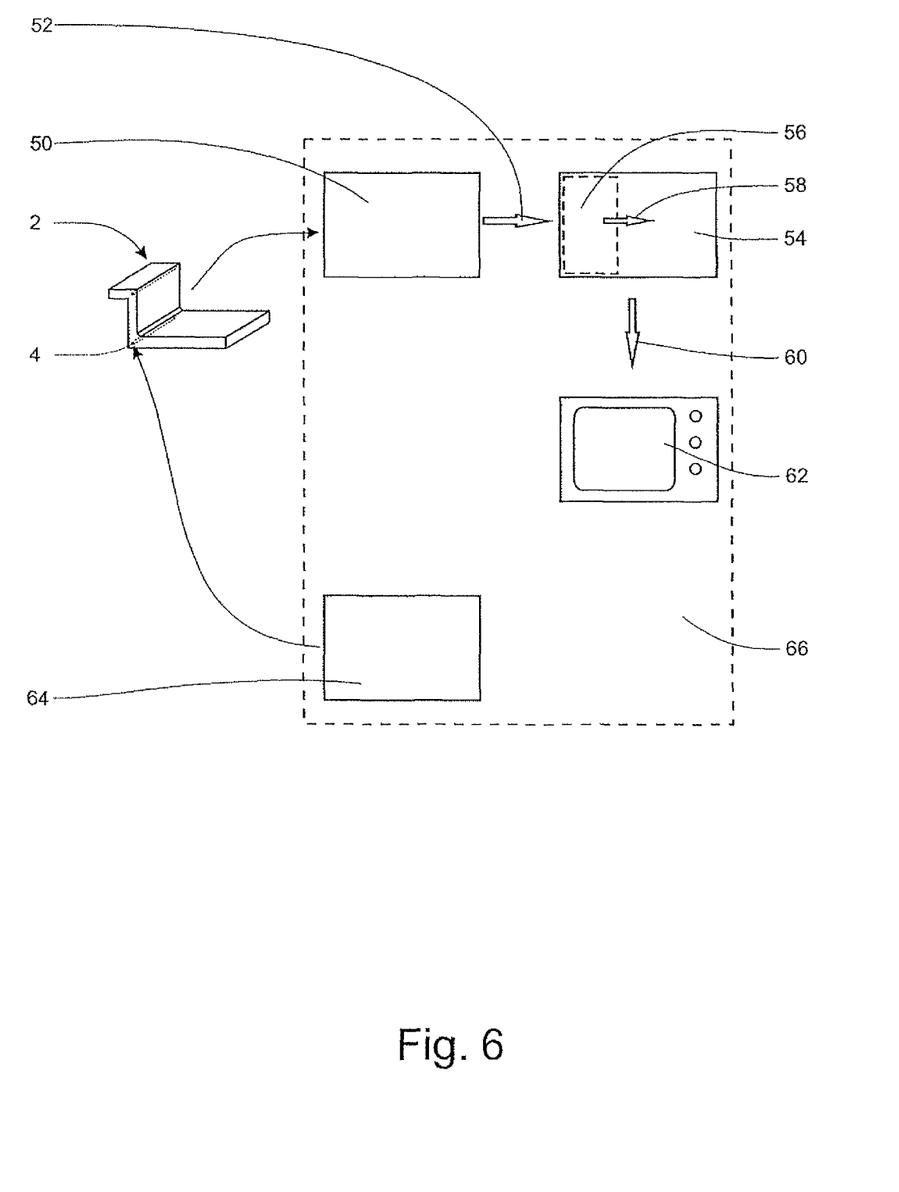
FIG. 6: a diagrammatic view of the components of the system according to the invention.

As diagrammatically shown in FIG. 6, in the system according to the invention, for detecting a defect, the sensor cavities 4 are connected to pressure transducers 50 (hereinafter also referred to as "air-volume flow sensors"), which depending on their design emit a specific electrical signal 52 that corresponds to the pressure determined. The pressure transducers 50 are connected to a device, for example a processing unit 54, for receiving and/or processing sensor data, with said pressure transducers 50 reading out the signal 52 from the pressure transducers. In the case of analogue signals 52 the processing unit 54 additionally comprises devices 56 for converting the signals 52 to digital data 58 that can be processed by a processing unit. If pressure transducers 50 are used that themselves already provide digital data 58, such devices 56 are not necessary. In order to determine whether the sensor cavity 4 that is associated with the digital data 58 is intact or defective, the digital data 58 is compared, by the processing unit, to a threshold value that depends on ambient conditions and is interpreted accordingly. According to the description above, a defect in a structural component results in excessive pressure or in an air volume flow in a sensor cavity 4 affected by the defect. The pressure transducer or air-volume flow sensor 50 measures the pressure or the air volume flow and provides this variable as an analogy signal 52 or as digital data 58 to the processing unit 54. The processing unit 54 compares the value, which has been converted to digital data 58, to a predetermined threshold value and interprets the sensor cavity 4 as being defective if the threshold value is exceeded. If a structural component comprises several sensor cavities 4, and if the processing unit knows the pressure values of all the sensor cavities 4, said processing unit can detect the positions of the cross section of the structural component where there is a defect.

The correspondingly interpreted pressure values are stored by the processing unit 54, for example as damage data 60, and/or are transmitted to a display device 62 to inform the user. From the totality of the damage data 62 of a monitored structure it is, furthermore, possible to prepare a maintenance plan or repair plan for the structure.

If the weight of the system according to the invention plays a decisive role, for example in the case of monitoring an aircraft structure, the components of the pressure-/air-volume flow sensor 50, processing unit 54, display device 62 and a vacuum pump 64 for evacuating the sensor cavities 4 are preferably not firmly coupled to the structure to be monitored. Integrating these components in one or several easily portable mobile monitoring devices 66 for use at prescribed maintenance intervals is then particularly sensible. During maintenance work, maintenance personnel can then connect the mobile monitoring device 66 to the connecting pieces 22 or the lines 18 in the monitored structural components, can evacuate the associated sensor cavities 4, and at the same time can acquire the pressure in the sensor cavities 4. Correspondingly detected errors are stored as damage data 60 and/or are displayed on the display device. If all the sensor cavities 4 have been measured, the acquired damage data 60 can be compiled and can be used in the preparation of a repair plan.

Preferably, all the above-mentioned components are connected to an individual connecting piece 22 of a respective sensor cavity 4 so that only a line 18 from the mobile monitoring device 66 to the respective sensor cavity 4 is necessary. However, in certain cases, connecting the vacuum pump 64 to a separate end, detached from the device 50 for acquiring the pressure or the air volume flow, of the respective sensor cavity 4 can also be advantageous.

Figure 7:
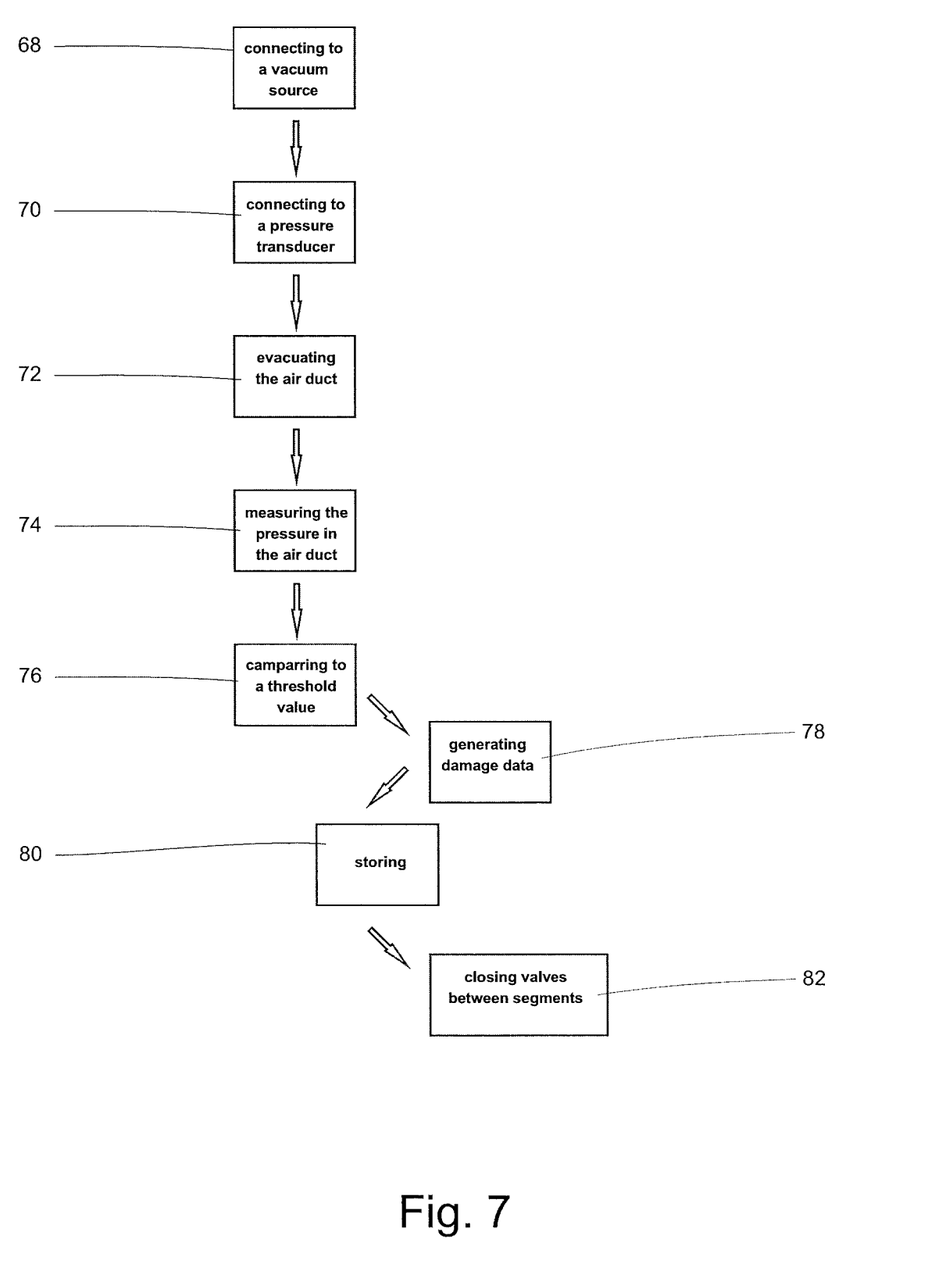
FIG. 7: a diagrammatic view of the method according to the invention.

Finally, the method according to the invention is diagrammatically shown in FIG. 7, with the numbering of the process steps used in FIG. 7 being shown in brackets below. First, one end of the air duct 4 is connected to the vacuum source 64 (step 68) and to the air flow sensor or pressure transducer (step 70). As an alternative to this two separate ends of the air duct 4 can be used when measuring is limited to air pressure measuring. Evacuation of the air duct 4 (step 72) is followed by measuring of the air volume flow and/or of the air pressure in the air duct 4 (step 74). A processing unit 54 is used to acquire and process the sensor data that represents the volume flow or the air pressure so that in a further step the determined air volume flow and/or air pressure can be compared to a threshold value (step 76). If the threshold value is exceeded, and accordingly a defect is detected by means of the associated air duct 4, damage data is generated (step 78). The damage data can be stored for further use (step 80). In order to narrow down the location of a structural defect in the case of several interconnected segments 38-44, optionally it is possible to close (step 82) valves that are arranged between the segments 38-44. Thereafter, measuring involving all the process steps can be carried out anew.

By means of the system according to the invention and the method according to the invention for monitoring the integrity of a structure or of a structural component, robust and reliable monitoring of a structure becomes possible. The sensors used, which are formed by air ducts in structural components, are insensitive to external influences and feature a long service life that corresponds to the service life of the components to be monitored. The invention is in particular described with reference to the example of structural aircraft components, but it can also be used in other fields in which load-bearing structures are constantly exposed to dynamic and static loads.

The invention claimed is:

1. A system for monitoring the integrity of a structure or of a structural component in an aircraft, comprising:
   at least one vacuum source;
   at least one device for acquiring at least one of an air volume flow or the air pressure,
   at least one structural component manufactured by extrusion or extrusion molding with at least one elongated air duct which by leaving out material in the profile cross section of the structural component is integrated in the structural component as a continuous hollow space in the manufacture of the structural component,
   wherein the air duct is connectable to the vacuum source and the at least one device for acquiring the at least one of the air volume flow or the air pressure in the at least one elongated air duct,
   wherein in the case of a structure that is intact in the region of the at least one elongated air duct, the air pressure in the air duct substantially corresponds to the air pressure of the vacuum source, and essentially no air volume flow passes through the air duct, while if a structural defect occurs in the region of the air duct, air from the surroundings of the structure or of the structural component enters the air duct and detectably increases the air pressure and the air volume flow in the at least one elongated air duct; and
   a plurality of valves for blocking the air flow and for narrowing down a region comprising a structural defect,
   wherein, in a case of a damage to an airduct, the damage dividing airduct into a first segment and a second segment, the first segment having a first end and a second end, the second segment having a third end and a fourth end, the second and the third ends being adjacent to the damage being sealed off and the first end and the fourth end interconnected by a bridge line for restoring a function of the damaged airduct.

2. The system of claim 1, further comprising at least one through hole that ends in the at least one elongated air duct for allowing the at least one elongated air duct to be connected from outside the at least one structural component to the at least one elongated air duct by an externally located line.

3. The system of claim 2,
   further comprising at least one connecting plug, connected to the at least through hole from outside the structural component, in each case to the at least one elongated air duct, for connection to an externally situated line.

4. The system of claim 3,
   wherein the ends of the at least one elongated air duct of the at least one structural component, for the purpose of protecting integrity of the at least one elongated air duct, comprise sealing plugs, solder points or weld points, blind rivets, screws or other mechanical closure means that are arranged externally of the at least one connecting plug.

5. The system of any one of claims 3,
   wherein the at least one connecting plug of the at least one structural component and a connecting plug of an adjacent structural component for expanding the respective adjacent air ducts are interconnected to form a shared air duct.

6. The system of claim 1,
wherein the respective air ducts of several structural components that are mechanically connected to form a structure are not interconnected and are monitored separately of each other to allocate the location of damage to the structural unit to one or several of the structural components.

7. The system of any one of claims 1,
wherein the respective air ducts of several structural components that are mechanically connected to form the structure are interconnected to form a single air duct and are monitored together.

8. The system of claim 1,
wherein a processing unit compares the sensor data associated with an air duct with a threshold value, and if the threshold value is exceeded, the processing unit configured to interpret the structure on the affected air duct as being defective and generate damage data relating to this defect.

9. The system of claim 8,
wherein the at least one device for acquiring at least one of the air volume flow or the air pressure, and the processing unit are configured as a compact, portable measuring unit.

10. A method for monitoring the integrity of a structure, the method performed by a system according to claim 1, the method comprising:
connecting the at least one elongated air duct of the at least one structural component to the at least one vacuum source;
connecting the at least one elongated air duct to the at least one device for acquiring at least one of an air volume flow or an air pressure in the at least one elongated air duct;
evacuating the at least one elongated air duct through the vacuum source;
measuring at least one of the air volume flow or the air pressure in the at least one elongated air duct using the at least one device for acquiring at least one of the air volume flow or the air pressure; comparing at least one of the air volume flow or the air pressure in the at least one elongated air duct to a threshold value using a processing unit;
interpreting the at least one structural component as defective or intact using the processing unit on the basis of the measured air volume flow, air pressure in the air duct or both,
closing off a first end of a first segment of a damaged air duct with a first sealing plug, the first end being adjacent to the place of damage and closing off a first end of a second segment of the damaged air duct with a second sealing plug, the first end being adjacent to the place of damage; and
interconnecting at least a first and a second connecting plugs by a bridging line, the first connecting plug arranged on a second end of the first segment distal from the place of damage and the second connecting plug arranged on a second end of the second segment distal from the place of damage,
wherein in front of or behind the individual structural components, a plurality of valves block the air flow so that if there is a fault message of the system the region comprising a structural defect can be narrowed down by blocking a valve and by renewed testing.

11. The method of claim 10,
wherein the respective adjacent air ducts of several structural components mechanically connected to form a structure are not interconnected and are monitored separately of each other in order to be able to allocate the location of damage to the construction unit to one or several of the structural components.

12. The method of claim 10,
wherein the respective air ducts of several structural components mechanically connected to form a structure are interconnected and are monitored jointly so that the number of lines that are necessary is reduced.

13. The system of claim 1, wherein the bridging line is external to the structure or the structural component.

* * * * *